Figure 1:
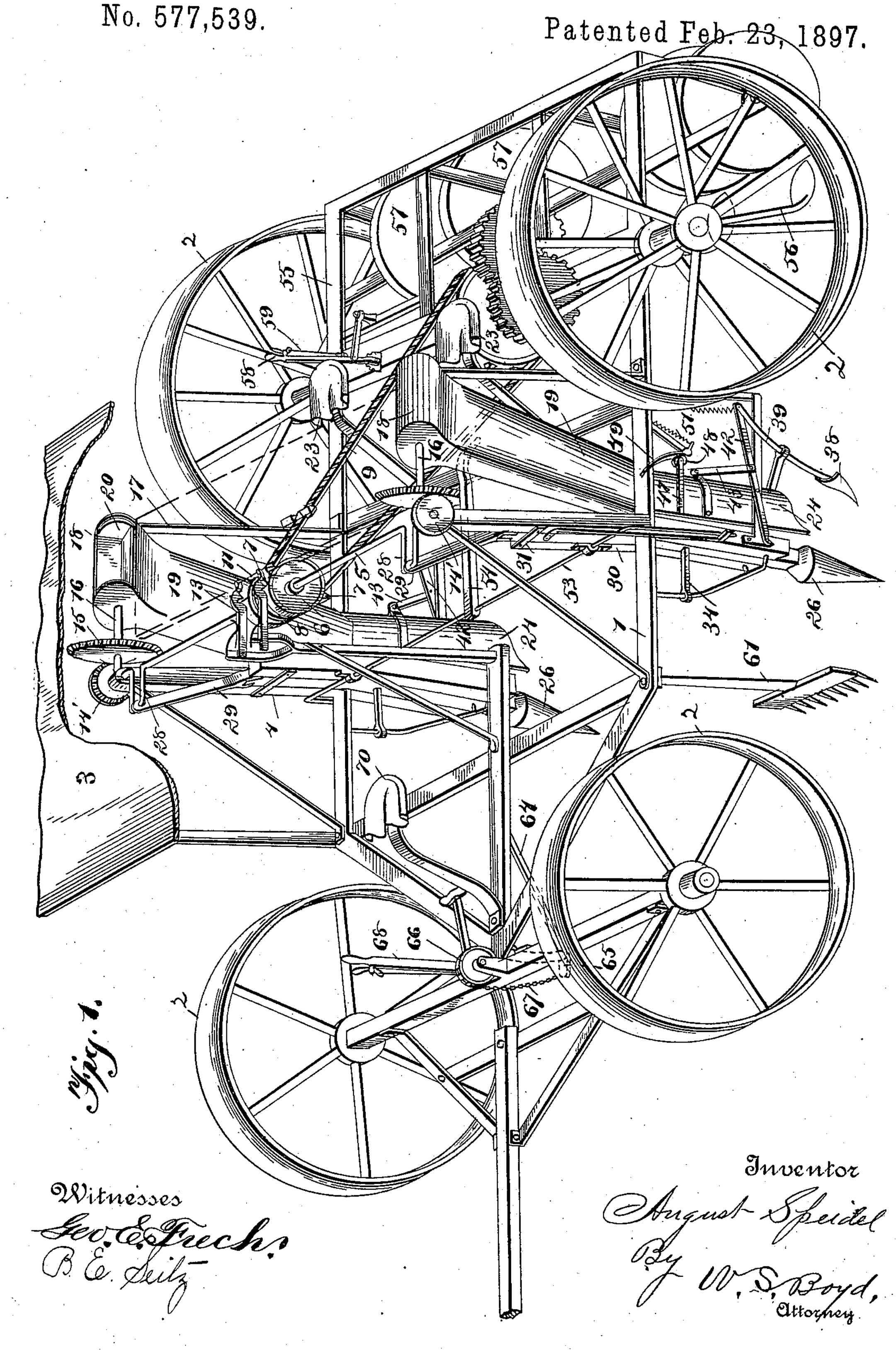

(No Model.)

4 Sheets—Sheet 1.

A. SPEIDEL.

TRANSPLANTER.

No. 577,539.

Patented Feb. 23, 1897.

Witnesses
Geo. E. Frech.
B. E. Seitz

Inventor
August Speidel
By W. S. Boyd,
Attorney.

THE NORRIS PETERS CO., PHOTO-LITHO., WASHINGTON, D. C.

(No Model.)

4 Sheets—Sheet 2.

A. SPEIDEL.

TRANSPLANTER.

No. 577,539. Patented Feb. 23, 1897.

Witnesses
Geo. E. Frech.
B. E. Seitz

Inventor
August Speidel
By W. S. Boyd,
Attorney

THE NORRIS PETERS CO., PHOTO-LITHO., WASHINGTON, D. C.

(No Model.)

4 Sheets—Sheet 3.

A. SPEIDEL.
TRANSPLANTER.

No. 577,539.

Patented Feb. 23, 1897.

Witnesses
Geo. E. Frech.
B. E. Seitz

Inventor
August Speidel
By W. S. Boyd,
Attorney

THE NORRIS PETERS CO., PHOTO-LITHO., WASHINGTON, D. C.

(No Model.)

4 Sheets—Sheet 4.

A. SPEIDEL.

TRANSPLANTER.

No. 577,539.

Patented Feb. 23, 1897.

Witnesses
Geo. E. Frech.
B. E. Seitz

Inventor
August Speidel
By W. S. Boyd,
Attorney

THE NORRIS PETERS CO., PHOTO-LITHO., WASHINGTON, D. C.

UNITED STATES PATENT OFFICE.

AUGUST SPEIDEL, OF LINCOLN, NEBRASKA.

TRANSPLANTER.

SPECIFICATION forming part of Letters Patent No. 577,539, dated February 23, 1897.

Application filed October 12, 1895. Serial No. 565,476. (No model.)

*To all whom it may concern:*

Be it known that I, AUGUST SPEIDEL, a citizen of the United States, residing at Lincoln, in the county of Lancaster and State of Nebraska, have invented certain new and useful Improvements in Transplanters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to transplanting-machines in which the plants are deposited in conveyers by operators riding upon the machine and are carried down to and deposited in holes in the earth formed for them by the machine, and the earth is packed around the plant by mechanism employed for that purpose. In devices of this kind it is necessary that the plants be deposited at the proper places or distances apart, so as to be cultivated in one or both directions, whether the ground has been previously provided with furrows or not, and it is also necessary that while the plant is being deposited in the earth the mechanism which is making the deposit should remain still, that is, it should not move forward with the movement of the machine; but as soon as the plant has been deposited it should be carried forward into position for depositing the next plant; and it is also necessary to provide the machine with some mechanism by which the earth may be packed around the plant, so that when water is applied the plant will be able to push its roots into the soil and commence growth without danger of its dying before it can receive nourishment from the soil. The machine should also be provided with means for graduating the depth at which the plants are deposited, and also with means for varying or changing the distance between the plants, so that more or less plants can be deposited in the same area of land.

The object of my invention is to produce a machine which shall be capable of performing these functions; and it consists in the construction and combination of parts of the same, as will be hereinafter more fully set forth.

Figures 2, 3, 8, 9, 10, 11:
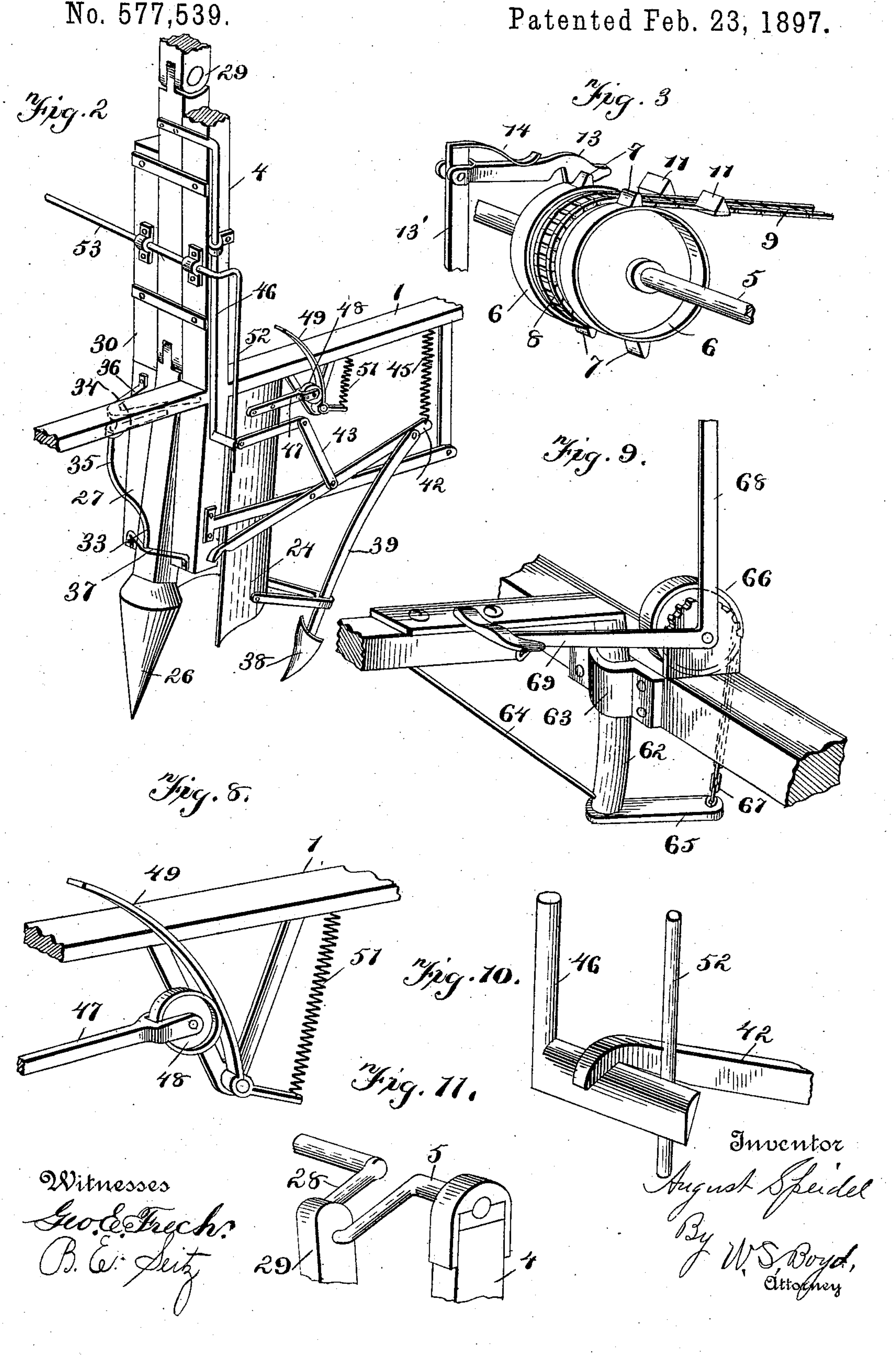
Figures 12, 13, 14, 15, 16, 17:
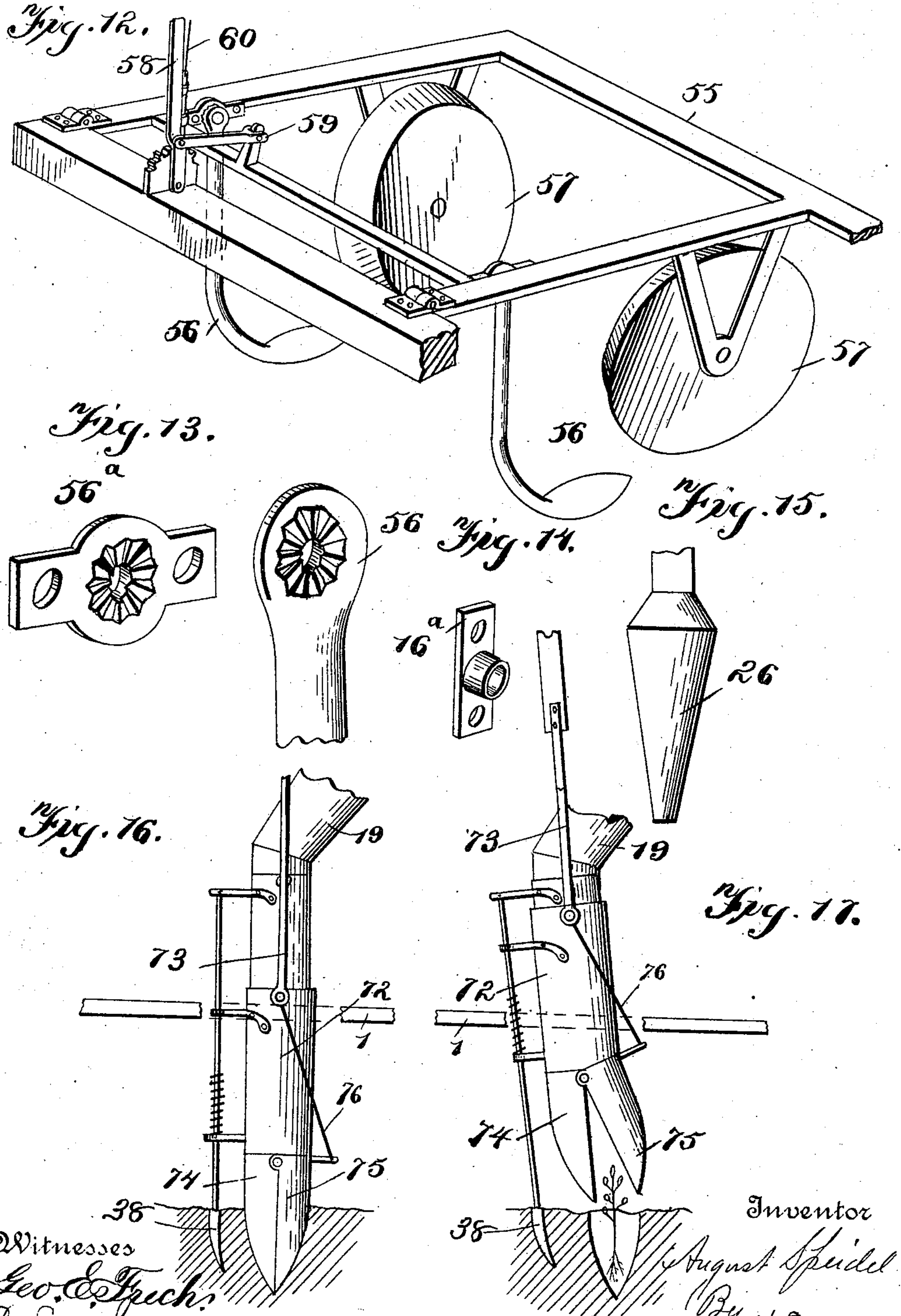

Referring to the accompanying drawings, in which the same reference-numeral indicates corresponding parts in each of the views in which it occurs, Figure 1 is a perspective view of my machine with some of the parts broken away to better show the construction of other parts. Fig. 2 is a perspective detail view of the mechanism for depositing the plants in the soil. Fig. 3 is a similar view of the mechanism for operating the same. Figs. 4, 5, 6, and 7 are side elevations of the depositing mechanism, showing the positions that the different parts assume in different steps of the planting operation. Figs. 8, 9, 10, 11, 12, 13, and 14 are detailed views, and Figs. 15, 16, and 17 are modifications.

Referring more particularly to the drawings, 1 indicates the frame of the machine, which may be of any desired material and shape, preferably substantially rectangular, which is supported upon suitable wheels 2, and may be provided with a suitable cover 3. The rims of the wheels are preferably concave, and the rear ones are the drive-wheels and are preferably provided with the ordinary pawl and ratchets to permit of turning at the ends of the rows. Substantially midway of the frame are two uprights 4 4, at the tops of which is journaled a transverse shaft 5, the central portion of which is provided with two wheels 6 6, rigidly secured thereto, the periphery of each of which is provided with two or more spurs or projections 7 7. Loosely mounted upon the shaft between these two wheels is a sprocket-wheel 8, over which runs a sprocket-chain 9, which is driven from the rear axle of the machine by any suitable gearing 10, as, for instance, that used upon mowing-machines.

Rigidly secured to the chain 9, at suitable distances apart, are blocks 11, which are arranged in pairs and project beyond each side of the chain and engage with two latches 12, (one only of which is shown,) and lift them out of engagement with the spurs on the wheels, so that the blocks on the chain may engage with the spurs and rotate the wheels and the shaft one-half a revolution for each pair of blocks; but as it is necessary to give the shaft a complete continuous rotation two pairs of blocks are located so close to each other on the chain that as soon as one pair is disengaged from its spurs the other pair engage with the other spurs of the wheels and cause the wheels and shaft to complete the revolution, after which the shaft is not rotated again until other pairs of blocks engage with the spurs and give the shaft another rotation. These latches are pivotally secured at the upper end of an upright 13, which has its lower end seated in the frame, and are each held down against the periphery of the wheel by a spring 14, so as to hold the wheels and shaft against rotation except when the blocks are carried in under the latches by the movement of the chain. Each end of the shaft 5 is provided with a bevel gear-wheel 14, which engages with a corresponding wheel 15 on the shaft 16, which is journaled at the upper end of the upright 4 and upright 17.

Secured to each side of the frame, with its upper end extending up to the shaft 16 and provided with a casing 18 at its upper end, is a tube or conveyer 19, the lower end of which extends forward and the rear side is inclined, so that when a plant is dropped into it from the upper end with the roots forward the top of the plant will strike the rear surface of the tube first and thereby cause the plant to descend the tube or chute roots foremost. Within the casing 18 are two heads 20, which are rigidly secured to the shaft 16 and are provided with four wings 21, which form movable compartments or cells in the casing, into which the plants are placed through an opening in the side of the casing as the shaft is revolved. The bottom of the casing is open, so that after a plant has been deposited in one of the compartments it will be carried forward with the rotation of the shaft and be dropped into the upper end of the tube or conveyer. The plants are preferably carried on a platform 22 (shown only in dotted lines in Fig. 1) and are deposited within the casings by operators, who occupy positions at the sides of the machine and may be seated on the seats 23 23.

Figures 4, 5, 6, 7:
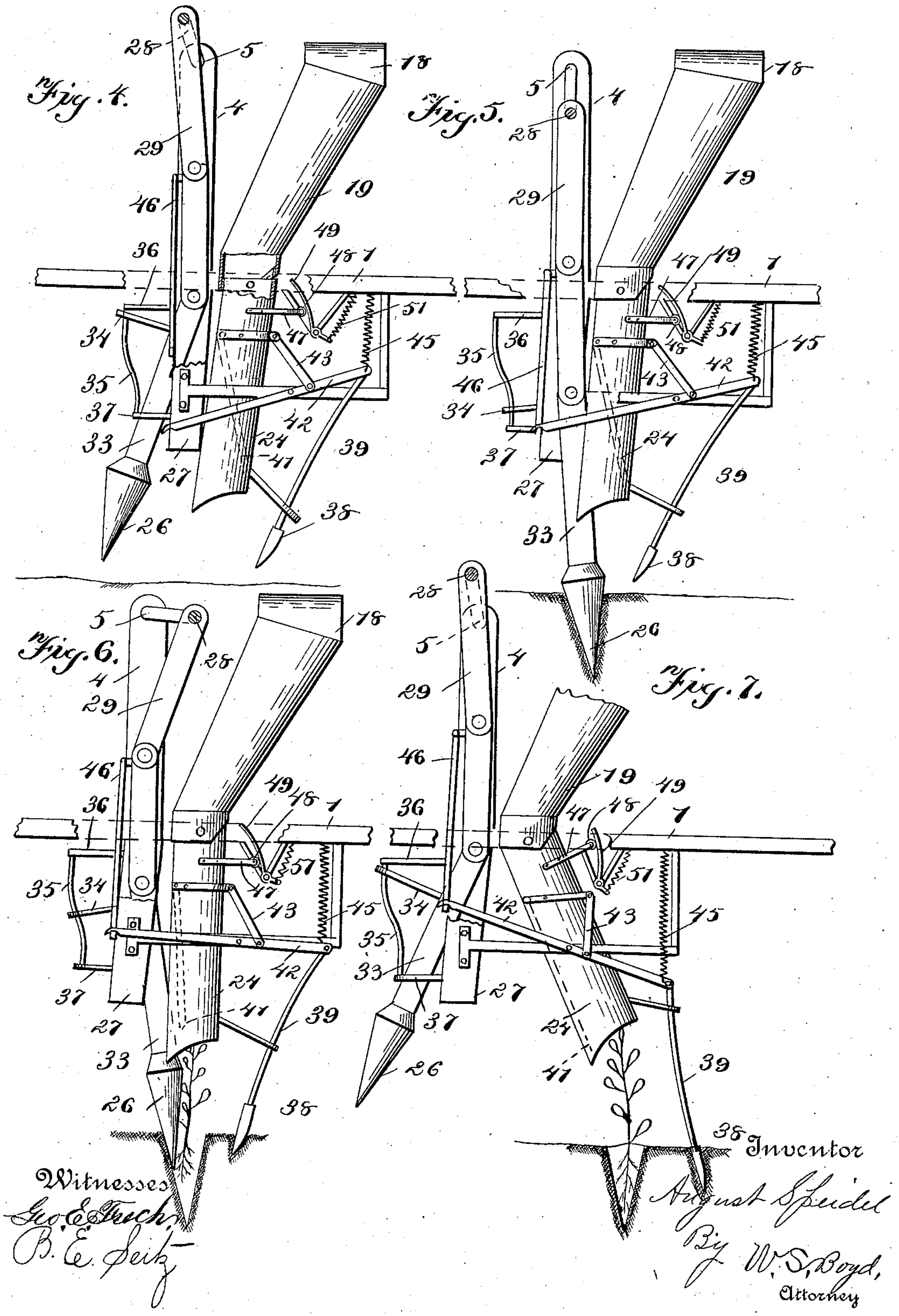

The lower end of the tube or chute communicates with an extension 24, which is provided with means for arresting the descent of the plant and holding it there until after a hole or opening has been made in the soil for its reception, when the extension is opened and the plant deposited; but as the machine has a constant forward movement and it requires time for making the opening in the soil and removing the tool and depositing the plant therein it is necessary that means be provided for suspending the forward movement of these parts until the operation has been completed. For this purpose I prefer to pivotally secure the extension to the lower end of the tube at its upper end, so that it may have a forward and backward movement at its lower or free end; but to do this it is necessary that the extension be of such a shape that its free end may be carried forward until it is directly over the tool that is making the hole in the ground and there be arrested while the tool is withdrawn and the plant deposited. For this purpose the extension is preferably made substantially semicylindrical or trough-shaped, with its open portion forward. The rear portion of the lower end of tube 19 is cut away and provided with a band 25, so as to let the lower end of the extension swing backward without the upper end coming in engagement with the main portion of the tube; but as the plunger 26 for making a hole in the ground must also have a vertical as well as a forward movement I prefer to provide the frame with extensions 27 in line with the supports or uprights 4 and to provide them with guideways by means of which the plunger may be reciprocated from a crank 28 on the shaft 5 by the pitman 29. One means of constructing such guideways is by securing pieces 30 parallel with and a short distance from the uprights and extensions by means of the strips 31, between which the cross-head 32 of the plunger may be reciprocated by means of the pitman 29. To the lower end of the reciprocating head 32 is pivotally secured the upper end of the stem 33 of the plunger 26, which will thus permit of the plunger being moved forward and backward at the same time as it has a vertical movement. For the purpose of holding the plunger at the same point while the machine is moving forward its stem is provided with a forwardly-projecting rod 34, the front end of which is provided with an eye which moves up and down the inclined guide 35, which is secured in front of the extension and guideway by means of the bracket 36 and cross-piece 37. As shown in Fig. 3, in its normal position the plunger is made to project slightly forward, but as soon as it begins to enter the ground the eye of the rod passes down onto the inclined portion of the guide and causes it to assume a vertical position, as shown in Fig. 4, and to assume a rearward inclination as the machine moves forward and the eye moves along the inclined portion of the rod and the plunger is withdrawn from the ground. While the plunger is thus operating the machine is moving forward, and as soon as the free end of the extension 24 of the tube has reached a point in its forward travel directly over the plunger its further forward movement is prevented by a spade or shovel 38, which is pivotally secured to the rear end of a lever 39 and has its forward end passed through an eye 40 at the rear portion of the lower end of the extension. As soon as the shovel enters the ground the free end of the extension is stopped and held stationary directly over the opening formed by the plunger and the plant is deposited therein by opening the lower end of the extension, which is done by swinging a gate or tongue 41 upon its hinges, as shown in Fig. 6. The tongue is swung upon its hinges by means of an arm 42, which has its rear end connected with the lever 39 by means of a link 43, which is secured thereto at its upper end and to the lever 39 just to the rear of the point where the lever is pivotally secured to its support 44. The rear end of the lever 39 is connected with the frame of the machine by a coiled spring 45, and the forward end is detachably connected with a vertically-movable spring hook or catch 46, which is secured to the cross-head of the plunger-operating mechanism.

As soon as the plant has been deposited the end of the extension must be quickly moved forward and the gate closed for the reception of the succeeding plant. For the purpose of effecting this movement the upper end of the tube may be provided with a rearwardly-projecting arm 47, the free end of which may be provided with an antifriction-wheel 48, which engages with a curved rocker-arm 49, which is pivotally secured in brackets 50 at the under side of the frame. The opposite end of this arm is connected with a spring 51, by means of which it is normally held in such a position as to hold the end of the extension forward. As soon, however, as the free end of the tube begins to move backward relatively to the forward movement of the frame the arm 47 engages with the arm 49 and forces it rearward against the tension of the spring 51; but as soon as the free end of the tube has been released by the withdrawal of the shovel from the ground the spring 51 instantly retracts, and through the arms 47 and 49 carries the free end of the extension forward. The shovel is released from the ground by releasing the front end of the lever 39 from the catch 46, when the spring 45 instantly draws the rear end of the lever upward into its normal position, and with it the shovel. This movement of the lever closes the gate against the rear wall of the tube by the action of the link 43 upon the arm 42.

To withdraw the shovel from the earth at the proper time, so that the extension will have moved forward and the gate closed in time to arrest the descent of the succeeding plant from the dropping mechanism, the catch 46 is forced out from under the end of the lever by an arm 52, which projects downwardly from a rock-shaft 53, journaled across the machine. The shaft is rocked at the proper time by an arm 54 at its center being engaged with the blocks 11 on the chain 9. By adjusting the parts to each other it will be evident that at every revolution of the shaft 5 each of the plungers will be forced into the earth and withdrawn, the extensions will be moved to the rear and forward, the gates opened and closed, and each of the shafts 16 and the wings 21 will be rotated a quarter of a revolution. To deposit more or less plants to the row, the revolution of the shaft 5 is adjusted to make more or less revolutions relatively to the revolutions of the driving-wheels 2, which can be done by varying the sizes of the gear-wheels 10 or changing the length of the chain 9 or the position and number of blocks 11 on the chain. As the machine ordinarily moves forward about four inches from the time the plunger enters the ground until the extension has been returned to its normal position, when it is set to deposit more or less plants to the row, all of the parts must be adjusted to operate in unison.

After having deposited the plant in the earth the machine moves forward until the tamping mechanism at the rear comes forward, which draws the earth around the plant and forces it down in a compact manner around the roots. This tamping mechanism consists of a frame 55, hinged to the rear end of the machine and provided with two sets of scrapers 56, one upon each side, and one scraper of each set being on each side of the row, whereby the rear end of each scraper is adapted to draw the earth in toward and deposit it around the plant. Following these scrapers are four wheels 57, one behind each scraper, which support the rear end of the frame, and each wheel is set at an inclination, so as to slightly compress the earth around the plant. This frame is provided with the ordinary hand-lever 58, which is connected thereto by means of the rod 59 and arm 60, by means of which the frame may be adjusted relatively to the ground or be raised entirely out of it. As an additional means for adjusting the scrapers they may be secured to the frame by means of the ordinary corrugated clamp and bolt, so that by loosening the bolt and setting the scrapers upon them as a pivot and again tightening the bolts the corrugations will prevent the scrapers from accidentally moving.

For the purpose of removing clods or other obstructions from in front of the planting mechanism a harrow-like scraper 61 may be secured to each side, which will project into the soil a short distance and break up or remove the clods and also loosen the ground ready to be scraped in toward the plant by the scrapers at the rear of the machine.

To adjust the height of the machine so as to deposit the plant at any required depth, and also to permit of the machine being turned, I secure the frame 1 to the front axle by means of what might be called a "curved" king-bolt 62, which is movable vertically through a suitable bearing 63, secured to the rear of the axle. The lower end of this bolt is strengthened by means of a brace 64, extending from the frame to the bottom of the bolt, and it is also provided with a short arm or bar 65, which is swiveled to the lower end of the bolt at one end and is connected at the other end with an adjusting-wheel 66 on the axle by means of a chain 67. This wheel is provided with the ordinary hand-lever 68 or a foot-lever 69, by means of which it may be turned so as to wind up or unwind the chain, and thereby move the pin vertically through its bearings. By making the pin slightly curved it is evident that it may be moved freely through its bearings, and the axle may be turned with the pin at any position relatively thereto. The hand-lever 68 and foot-lever 69 are each in convenient position to the seat 70, so that the driver may vary the height of the frame from his seat by either one of the levers.

Instead of using a pointed plunger, as heretofore shown and described, a blunt plunger 71, as shown in Fig. 15, may be used; and instead of using the form of extension heretofore shown and described the planting mechanism may be formed as shown in Figs. 16 and 17, in which the extension 72 forms the plunger and is vertically movable on the lower end of the upper tube 19 and is connected directly with the cross-head by the bifurcated pitman 73 and has its lower end provided with two wings 74 and 75, the rear one of which is provided with a rearwardly-projecting arm 76, which is connected to the operating mechanism, so that when the tube is moved upward the arm will be moved, and thereby the tube will be opened and the plant released. In this construction the tube itself is made pointed, so that it will be forced down into the earth as a plunger, and the shovel or releasing device is placed in front, so as to engage with the earth and operate the tripping mechanism whereby the tube is opened and withdrawn. The stem of this plunger is guided through a bracket 77 on the lower end of the tube 19 and by two brackets 78 and 79 on the vertically-movable portion of the tube, and it is released and drawn back by the same mechanism as described for the other form of plunger, and therefore is not shown.

Instead of using the machine for transplanting or setting out plants, it is evident that other things may be deposited in the ground, as, for instance, corn, potatoes, and other seeds, by simply depositing said substances in the upper end of the tubes or conveyers and permitting them to pass down through the tubes into the ground. It is also evident that the machine may be used upon soil that has been prepared beforehand by furrowing or marking it, or upon land that has had no previous preparation of that kind.

It is also evident that other changes may be embodied in the machine without departing from my invention, as, for instance, the plunger may be provided with a spiral thread, so as to make a partial or whole turn in its movement into and out of the earth, as shown in dotted lines in Fig. 15; or other forms of gearing may be substituted for producing the intermittent movement of the parts than what I have shown and described without departing from the spirit of my invention; and, if desired, watering and fertilizing attachments may be secured to the machine, but, as they are of any ordinary construction, I have not thought it necessary to show them or describe them more fully.

Having thus described my invention, I claim—

1. In a transplanting-machine, the combination, with a frame, of consecutively vertically, forwardly and rearwardly movable planting mechanism and means for giving said planting mechanism an intermittent movement, substantially as set forth.

2. In a transplanting-machine, the combination, with a frame, of a vertically, forwardly and rearwardly movable plunger, of a forwardly and rearwardly moving conveyer extension, and means for operating the same, substantially as set forth.

3. In a transplanting-machine, the combination, with a frame, of a vertically, forwardly and rearwardly movable plunger, of a movable conveyer extension, and means for stopping the forward movement of the extension during a portion of the forward movement of the machine, substantially as set forth.

4. In a transplanting-machine, the combination, with a frame, of a vertically, forwardly and rearwardly moving plunger, and means for operating the same, of a conveyer extension suspended directly to the rear of the plunger, and a shovel for engaging with the earth and preventing the forward movement of the extension during a portion of the forward movement of the machine, substantially as set forth.

5. In a transplanting-machine, the combination, with a frame, of a vertically-movable plunger, of an inclined guide for moving the plunger forward and rearward, a conveyer extension to the rear of the plunger, and means for stopping the movement of the extension and opening and closing the same during a portion of the forward movement of the machine, substantially as set forth.

6. In a transplanter, the combination, with a frame, of a vertically-movable plunger, a forwardly and rearwardly movable conveyer, a shovel, a spring-actuated lever connected therewith, a gate in the conveyer, and means for connecting the lever with the gate and with the plunger-operating mechanism, substantially as set forth.

7. In a transplanter, the combination, with a frame, of a vertically-movable plunger, a guide for giving the plunger a backward and forward movement, a substantially U-shaped conveyer extension to the rear of the plunger, a gate in the plunger, an arm connected therewith, a spring-actuated lever, a link for connecting the arm with the lever, a shovel connected with the lever and with the rear portion of the extension and means for connecting the lever with the plunger-actuating mechanism, substantially as set forth.

8. The combination, with a frame, of a vertically, forwardly and rearwardly movable plunger, of a conveyer extension pivotally secured to the rear thereof, an arm secured to the extension, a spring-actuated rocker-arm to the rear thereof, and adapted to be engaged thereby, and means for stopping the forward movement of the extension during a portion of the movement of the machine, and for opening the lower end of the extension, substantially as set forth.

9. In a transplanting-machine, the combination, with a frame, of supports thereon, a shaft journaled in said supports, an intermittingly-movable dropper at each end of the shaft, a tube or conveyer extending from each of said droppers below the frame, the lower end of which is provided with an extension which is pivoted so as to have a forward and backward movement, a vertically-movable plunger in front of each extension, and means for operating the dropper uniformly with the movement of the plunger, and for stopping the forward movement of the extension, and for opening and closing the same, substantially as set forth.

10. In a transplanting-machine, the combination, with a frame, of a shaft journaled thereon, two wheels rigidly secured to the shaft the periphery of each of which is provided with spurs, a sprocket-wheel loosely mounted upon the shaft between said wheels, a latch for engaging with the projections of each wheel, a sprocket-chain over the sprocket-wheel provided with pairs of blocks, a dropping attachment at each end of the shaft, a conveyer leading from each dropper to the surface of the ground, a plunger for each conveyer connected with the shaft and adapted to be operated thereby, and mechanism for moving the lower end of the conveyer and opening and closing it, substantially as set forth.

11. In a transplanting-machine, the combination, with a frame, of an operating-shaft supported thereby, each end of which is provided with a bevel-gear, a dropper-shaft at each end of the operating-shaft, each provided with a bevel-gear in engagement with the corresponding gear of the operating-shaft, a casing around each of said operating-shafts, a conveyer extending from each casing to near the surface of the ground, wings upon the shafts, within the casing, a plunger for each conveyer, and means for stopping the forward movement of the lower end of each conveyer, substantially as set forth.

12. In a transplanter, the combination, with a frame, of supports thereon, provided with guideways, a shaft journaled at the upper end of said supports, and provided with a crank adjacent each support, a vertically-movable block in each of said guideways, one end of which is connected with the crank, and the other end is provided with a plunger, means for giving each plunger a forward and rearward movement simultaneous with its vertical movement, a conveyer leading to the rear of each plunger and means for opening the same and holding a portion of it stationary during a portion of the forward movement of the machine, substantially as set forth.

13. The combination, with a transplanter, of a frame, the front end of which is provided with a curved king-bolt, a clamp for securing the bolt to the front axle, an adjusting-wheel on the axle, and a chain from the lower end of the bolt to the hand-wheel, substantially as set forth.

In testimony whereof I affix my signature in presence of two witnesses.

AUGUST SPEIDEL.

Witnesses:

CHAS. A. ROBBINS,

W. J. BROWN.